US012323537B1

(12) United States Patent
Sethi (10) Patent No.: US 12,323,537 B1
(45) Date of Patent: Jun. 3, 2025

(54) SYSTEM FOR SECURE MANAGEMENT OF TARGET CLUSTERS

(71) Applicant: COREDGE.IO, INDIA PRIVATE LIMITED, Noida (IN)

(72) Inventor: Prabhjot Singh Sethi, Bangalore (IN)

(73) Assignee: COREDGE.IO, INDIA PRIVATE LIMITED, Noida (IN)

( * ) Notice: Subject to any disclaimer, the term of this patent is extended or adjusted under 35 U.S.C. 154(b) by 342 days.

(21) Appl. No.: 17/662,784

(22) Filed: May 10, 2022

(51) Int. Cl.
*H04L 9/32* (2006.01)
*H04L 9/40* (2022.01)
*H04L 67/133* (2022.01)

(52) U.S. Cl.
CPC .......... *H04L 9/3263* (2013.01); *H04L 9/3247* (2013.01); *H04L 63/166* (2013.01); *H04L 67/133* (2022.05)

(58) Field of Classification Search
CPC ... H04L 9/3263; H04L 9/3247; H04L 63/166; H04L 67/133
See application file for complete search history.

(56) References Cited

U.S. PATENT DOCUMENTS

| | | | | |
|---|---|---|---|---|
| 9,491,261 | B1 * | 11/2016 | Shagam | H04L 67/133 |
| 11,552,803 | B1 * | 1/2023 | Simkhada | H04L 63/0823 |
| 2015/0334110 | A1 * | 11/2015 | Bishop | H04L 63/0823 |
| | | | | 713/156 |
| 2020/0084203 | A1 * | 3/2020 | Gupta | H04L 63/0823 |
| 2021/0058388 | A1 * | 2/2021 | Knotwell | H04L 9/3268 |
| 2021/0377044 | A1 * | 12/2021 | Leibmann | H04L 9/3247 |
| 2021/0397712 | A1 * | 12/2021 | Gajananan | G06F 21/53 |
| 2022/0006654 | A1 * | 1/2022 | Sharma | H04L 63/0823 |
| 2022/0385532 | A1 * | 12/2022 | Erez | H04L 63/0823 |
| 2023/0155984 | A1 * | 5/2023 | Adam | H04L 63/0823 |
| | | | | 726/26 |
| 2023/0333897 | A1 * | 10/2023 | White | G06F 9/5027 |

OTHER PUBLICATIONS

"Authentication", gRPC, gRPC Authors 2022, 18 pages. Retrieved from the Internet: URL: https://grpc.io/docs/guides/auth/.

(Continued)

*Primary Examiner* — Patrice L Winder
(74) *Attorney, Agent, or Firm* — Lindauer Law, PLLC (57) ABSTRACT

Clusters of devices providing information services are deployed at network edges, such as in neighborhoods and at cell sites. To facilitate secure management of these many services, a secure persistent connection is provided between a target cluster and a controller system. The connection may utilize gRPC sent via a mutual transport layer security (mTLS). The persistent connection allows a controller system to maintain administrative communication with many clusters. For example, the controller may act as a proxy application programming interface (API) endpoint, passing a request to a specific Kubernetes API server within a target cluster, and in turn passing responses returned via the connection. Multiple levels of security may be used to improve resistance to attack and network address space efficiency at the edge is improved by using port addressing. The system also supports implementations in which the target cluster is behind an address translation device.

20 Claims, 7 Drawing Sheets

(56) References Cited

OTHER PUBLICATIONS

"Class Context", Context (grpc-all 1.45.0 API), 11 pages. Retrieved from the Internet: URL: https://grpc.github.io/grpc-java/javadoc/io/grpc/Context.html.

"gRPC with Mutual TLS Between Go and Python", Rollie Ma, Oct. 3, 2019, 11 pages. Retrieved from the Internet: URL: https://blog.rollie.dev/posts/grpc-with-mutual-tls-between-go-and-python/.

"Kubernetes Components", 4 pages. Retrieved from the Internet: URL: https://kubernetes.io/docs/concepts/overview/components/.

"Overview—Protocol Buffers", Google Developers, 9 pages. Retrieved from the Internet: URL: https://developers.google.com/protocol-buffers/docs/overview.

"TLS bootstrapping", Kubernetes, The Kubernetes Authors and The Linux Foundation 2022, 15 pages. Retrieved from the Internet: URL: https://kubernetes.io/docs/reference/command-line-tools-reference/kubelet-tls-bootstrapping/.

"Using mtls-auth plugin—v2.2.x", Kong Docs, Kong Inc., 2022, 9 pages. Retrieved from the Internet: URL: https://docs.konghq.com/kubernetes-ingress-controller/2.2.x/guides/using-mtls-auth-plugin/.

"What is mutual TLS (mTLS)?", Cloudfare, Inc., 2022, 6 pages. Retrieved from the Internet: URL: https://www.cloudflare.com/learning/access-management/what-is-mutual-tls/.

Gruchalski, Radek, "firebuild rootfs—gRPC with mTLS", Radek Gruchalski 2015-2022, 6 pages. Retrieved from the Internet: URL: https://gruchalski.com/posts/2021-03-28-firebuild-rootfs-grpc-with-mtls/.

Morgan, William, "A Kubernetes engineer's guide to mTLS", Buoyant, Inc., 2022, 15 pages. Retrieved from the Internet: URL: https://buoyant.io/mtls-guide/.

\* cited by examiner

SYSTEM FOR SECURE MANAGEMENT OF TARGET CLUSTERS

BACKGROUND

Many services utilize computational resources during operation. For example, a mapping service may operate servers or other computing devices that respond to user requests for travel directions. Traditionally a relatively small number of datacenters closer to a core of the network have hosted these servers. However, these servers have begun to be deployed in more locations, moving from the core towards clusters of devices located closer to the edge of the network. Connectivity between a controller and each of these clusters is useful for management and other functions.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Services that use computational resources, such as computing devices or instructions executing on those computing devices, are in increasing demand. Overall system architectures are moving away from large datacenters connected to communication backbones towards computing devices that are distributed closer to end users. For example, instead of a single core datacenter serving a particular state, computational resources may be deployed to edges of the network within that state, such as in various regions, cities, or at wireless network base stations. Providing computational resources closer to the edge of the network results in several advantages. For example, network latency between an end user and a service provided by the computational resource is substantially reduced, improving responsiveness to an end user. In another example, network traffic that would otherwise be backhauled to a central datacenter is decreased, freeing up bandwidth for other uses. In yet another example, redundancy is improved by allowing for operation in the event of a loss of connectivity between the edge computational resource and a central datacenter.

While compelling, these advantages do introduce some disadvantages. One such disadvantage is a substantial increase in the number of different physical locations at which the computational resources may be deployed. For example, instead of thirty regional datacenters, the computational resources may be deployed to fifty thousand separate wireless network base stations.

Various systems facilitate the management and orchestration ("MAO") of distributed computational resources. One MAO system is Kubernetes as promulgated by the Cloud Native Computing Foundation at "cncf.io". Kubernetes allows for automated software deployment and management. Other distributions of Kubernetes include OpenShift promulgated by Red Hat, Inc which may be used to provide management and orchestration. Other systems such as Docker Swarm as promulgated by Docker, Inc. may also provide at least some management and orchestration functionality.

A controller comprising one or more computing devices may be used to manage operation of many target clusters. Each target cluster may comprise one or more computing devices, at a particular physical location, that execute instructions to provide various functionality.

However, given the pace of technological development and the changing technological and network environment, management and orchestration systems such as Kubernetes exhibit several limitations. One of these limitations is the presumption that communication between a controller and a participating computing device is available and secure. For example, these systems may assume that the controller and the participating computing device are connected to a common private network that is secure from malicious interception. While this assumption may have been valid years ago when originally conceived, this is no longer true.

Various attempts to resolve the problem of secure communication between the controller and target devices have been tried but introduce substantial complexity and cost. For example, a virtual private network (VPN) may be established between a target cluster and the controller. However, a VPN requires substantial computational resources to operate and administrative overhead, especially as the quantity of target clusters increases. A VPN may also be infeasible due to other factors such as resource sharing, containerization, and so forth. In another example, a secure shell protocol (SSH) may be used to provide communication between the target cluster and the controller. However, the SSH suffers many security considerations making it unsuitable for use.

Described in this disclosure are techniques and systems for providing a secure persistent connection that may be used to facilitate secure management of target clusters. Each target cluster may have an individual secure persistent connection with the controller. The controller may direct data to and from a particular target cluster. This data may include application programming interface (API) requests received from a sender, such as another service or system. The controller sends the API request to the target cluster via the secure persistent connection. If the controller receives an API response via the secure persistent connection, the controller forwards the API response to the sender.

The connection is secure in that payload sent via the connection is cryptographically encrypted and may also be encoded using a specified protocol buffer. In the unlikely event that the cryptographic encryption is penetrated, the encoding provides an additional barrier to interpretation of the payload. The connection is persistent in that is it maintained over time, such as for minutes and hours. In the event the connection fails or is terminated, the target cluster will attempt to re-establish the secure persistent connection. Once established, the secure persistent connection is bidirectional, allowing data to be transferred between the controller and the target cluster.

In one implementation, the controller determines a cluster identifier and designates that the cluster identifier is approved for further installation. For example, this may be responsive to a request from an operator to add a new target cluster. The controller determines manifest data. The manifest data may specify software that is to be installed on the target cluster, a root certificate authority certificate, and be associated with the cluster identifier. For example, the software to be installed may comprise an agent that operates with the controller to provide the secure persistent connection.

The target cluster receives and processes the manifest data. For example, the target cluster may install the agent and determine an authentication key that is associated with that target cluster. The agent may then send a registration request to the controller that includes the cluster identifier authentication key.

The controller receives the registration request and confirms that the cluster identifier matches a previously stored cluster identifier that is approved for installation. The controller may then wait for a bootstrap request.

The agent may generate a private key. The agent then uses the private key to generate a certificate signing request. A request for cryptographic authentication is then sent from the target cluster to the controller. This request includes the certificate signing request, and may include other information such as the cluster identifier and authentication key. For example, the agent may send a bootstrap request.

The controller determines that the bootstrap request is valid and generates a signed certificate responsive to the certificate signing request. The signed certificate is then sent to the agent. The agent uses the signed certificate to establish the mutually authenticated connection with the controller. For example, a mutual Transport Layer Security (mTLS) may be established.

The agent may then initiate a remote procedure call (RPC) communication with the controller. For example, the agent may initiate a gRPC stream using gRPC as promulgated by the Cloud Native Computing Foundation at "grpc.io". The RPC communication may use protocol buffers or other techniques to specify serialization of structured data being transferred. For example, gRPC may utilize protocol buffers that specify name-value pairs.

The secure persistent connection described herein supports each gRPC stream using a respective internet protocol (IP) port number. This provides a substantial improvement in utilization efficiency of network address space. For example, many target clusters at a particular location may share a common network address, but each target cluster has a different IP port number. Continuing the example, given an IP version 4.0 address space, a single IP address may be used to communicate with over 65,000 target clusters at that address. The IP port numbers used for the secure persistent connection may be selected to avoid conflict with IP port numbers reserved for operation of the system.

By using the techniques and systems described herein, secure persistent connections are efficiently and effectively deployed across many target clusters. These secure persistent connections may then be used to provide for management and orchestration of distributed systems. Address utilization is efficient, facilitating operation of target clusters using collocated or shared resources. The system has relatively low overhead during setup and ongoing operation, reducing consumption of compute resources.

Illustrative System

Figure 1:
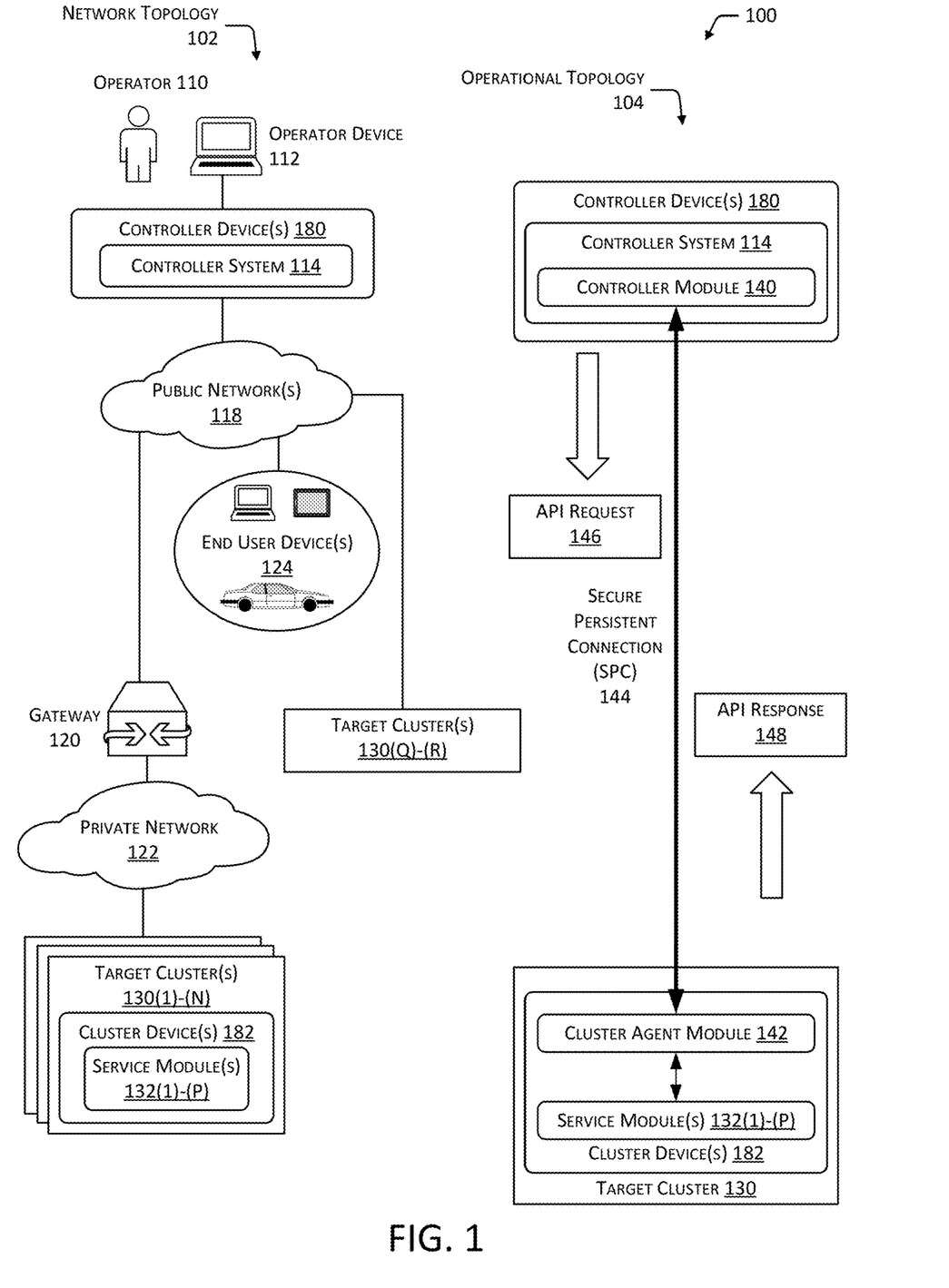
FIG. 1 depicts a system that implements a secure persistent connection to allow for secure communication between a controller and devices at a remote target cluster, according to one implementation.

FIG. 1 depicts a system 100 that implements a secure persistent connection to allow for secure communication between a controller and devices at a remote target cluster, according to one implementation. A network topology 102 and an operational topology 104 are depicted.

An operator 110, such as a developer, administrator, and so forth, may use an operator device 112 to interact with a controller system 114. The operator device 112 may comprise a desktop computer, laptop computer, tablet computer, or other computing device. For example, the operator 110 may use the operator device 112 to send instructions to the controller system 114, present information from the controller system 114, and so forth.

One or more controller devices 180 execute instructions to provide to the controller system 114. The controller system 114 may comprise a management and orchestration system. For example, in a Kubernetes system the controller system 114 may operate as a Kubernetes master, providing control plane functionality. The operator 110 may add, remove, or modify target clusters 130, or perform other tasks associated with the target clusters 130 using the control plane functionality. This is described with regard to the operational topology 104 below.

The controller devices 180 connect to one or more public networks 118, such as the Internet. The public networks 118 in turn may connect, via one or more networking devices such as gateways 120, to respective private networks 122. For example, a private network 122 may connect via a gateway 120 to the public network 118. Continuing the example, the private network 122 may provide connectivity within a particular datacenter, business premise, residence, colocation site, and so forth. In some implementations, the gateway 120 may provide other functionality, such as network address translation (NAT).

Each private network 122 may be in communication with one or more target clusters 130(1)-(N). In some implementations, one or more target clusters 130(Q)-(R) may be in communication with the public network 118.

Each target cluster 130 may comprise one or more cluster devices 182. The cluster devices 182 may comprise one or more computing devices such as general processing units, graphics processing units, application specific integrated circuits, cryptographic processors, and so forth. The cluster devices 182 may execute instructions that operate as one or more service modules 132(1)-(P). The service modules 132 may provide one or more computational services or processing functions to end user devices 124. For example, an end user device 124 may send data to a service module 132 for processing. The service module 132 may then return a response to the end user device 124. The end user devices 124 may include workstations, tablet computers, embedded devices, vehicles, and so forth.

The cluster devices 182, and corresponding target cluster 130, may be located at different physical locations. For example, different cluster devices 182 may be located at different datacenters, businesses, residences, colocation sites, wireless network base stations, vehicles, and so forth.

Traditional systems are unable to provide saleable secure communication between the target clusters 130 and the controller system 114. For example, a virtual private networking (VPN) system may be unable to support fifty thousand target clusters 130. Additionally, the administrative overhead and resources associated with maintaining a VPN may be too costly.

As shown in the operational topology 104, the controller devices 180 executing the controller system 114 executes instructions to provide a controller module 140. A cluster device 182 executes instructions to provide a cluster agent module 142. The controller module 140 and the cluster device 182 operate to provide a secure persistent connection (SPC) 144 between the two. The SPC 144 may be used to transfer application programming interface (API) requests 146 and API responses 148.

For example, the controller module 140 receives, from a sender such as another module of the controller system 114 or system in communication with the controller system 114, an API request 146 addressed to a particular target cluster 130 or service module 132 therein. The controller module 140 then sends the API request 146 to the target cluster 130 via the SPC 144. The cluster agent module 142 at the target cluster 130 sends the API request 146 to the service module 132 executing on the cluster devices 182. The service module 132 may return an API response 148 to the cluster agent module 142. The cluster agent module 142 sends the API response 148 to the controller module 140 via the SPC 144. The controller module 140 may then send the API response 148 to the sender of the API request 146.

The SPC 144 is bidirectional. For example, the cluster agent module 142 may send an API request 146 to the controller system 114. Continuing the example, the cluster agent module 142 may receive an API response 148 via the SPC 144.

By using the SPC 144, the controller module 140 is able to perform management and orchestration of functions to direct operation of the target cluster 130 or at least a portion of the cluster devices 182 therein, or service modules 132 executing on those cluster devices 182.

While a single operator 110 and operator device 112 are shown, it is understood that a given operator device 112 may have a plurality of control sessions with respect to one or more target clusters 130. Similarly, a plurality of different single operators 110 and their associated operator devices 112 may have a plurality of control sessions to interact with one or more target clusters 130. The system 100 thus supports "M×N" communications, where M is any number of different operators 110 and N is any number of target clusters 130(N).

The following figures describe some implementations of establishing the SPC 144 and aspects thereof.

Figure 2A:
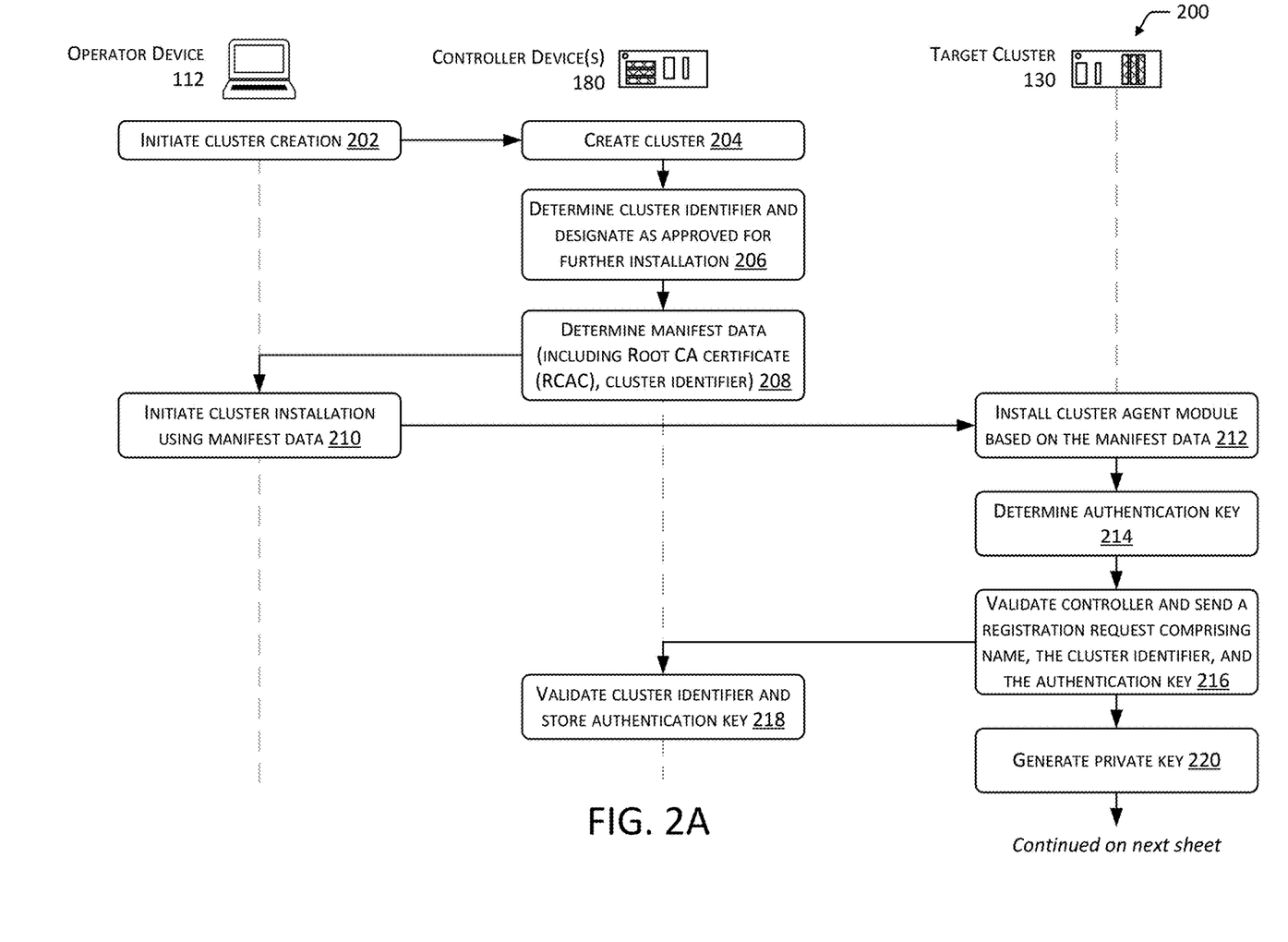
FIGS. 2A-2B depict a flow diagram of a process of establishing a secure persistent connection, according to one implementation.
Figure 2B:
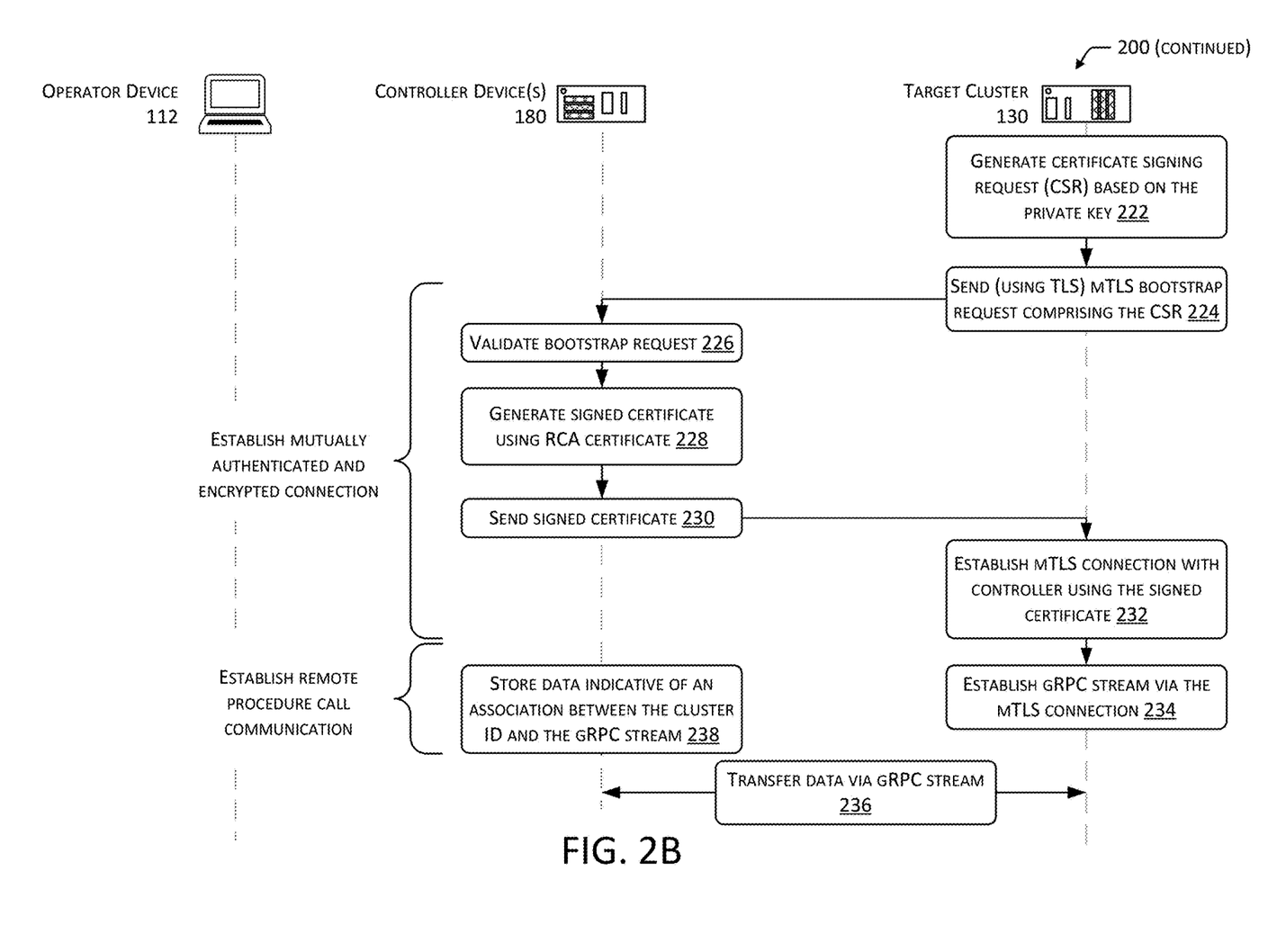

FIGS. 2A-2B depict a flow diagram 200 of a process of establishing a secure persistent connection (SPC) 144, according to one implementation. The process may be performed by one or more of the operator device 112, the controller device(s) 180, or the cluster device(s) 182. The controller system 114 executing on the controller device(s) 180 may perform the operations associated with the controller device(s) 180. The cluster agent module 142 executing on the cluster device(s) 182 may perform at least some of the operations associated with the cluster device(s) 182.

At 202 an operator device 112 initiates cluster creation. For example, the operator device 112 may be in communication with the controller device 180 and sends a command to create a new target cluster 130.

At 204 the controller device(s) 180 creates a target cluster 130.

At 206 the controller device(s) 180 determines a cluster identifier that is associated with the target cluster 130. The cluster identifier may also be designated as approved for further installation. For example, the cluster identifier may be added to a list of approved clusters.

At 208 the controller device(s) 180 determines manifest data. The manifest data may comprise the cluster identifier and cryptographic credentials. In one implementation, the cryptographic credentials may comprise a root certificate authority certificate (RCAC). The RCAC may be obtained from a certificate authority (CA). The manifest data may also specify computer-executable modules, such as software, to be installed on the target cluster 130. For example, the manifest data may include a network address to retrieve installation files to install the cluster agent modules 142.

At 210 the operator device 112 initiates cluster installation. For example, the operator device 112 may send the manifest data to the target cluster 130. In another example, the operator device 112 may send a command to the controller device(s) 180 or another system, that in turn sends the manifest data to the target cluster 130.

At 212 the target cluster 130 installs the cluster agent module 142 based on the manifest data. For example, the manifest data may specify a network address from which the cluster agent module 142 is to be retrieved and subsequently executed to perform an installation.

At 214 an authentication key is determined. The authentication key may be indicative of the particular target cluster 130, distinct from the cluster identifier. In some implementations, the authentication key may comprise a token, nonce value, and so forth.

At 216 the target cluster 130 may validate the controller device. The target cluster 130 may validate the controller device 180 using the RCAC included in the manifest data. If the validation is successful, the target cluster 130 sends a registration request to the controller device(s) 180. The registration request may comprise one or more of a name value, the cluster identifier, the authentication key, and so forth.

At 218 the controller device 180 receives the registration request, determines that the cluster identifier is valid for installation, and stores the authentication key. For example, the controller device 180 may compare the cluster identifier included in the registration request with the cluster identifier stored at 206. The authentication key is associated with the cluster identifier within the data store used by the controller device 180. In another implementation (not shown), the operations at 216 and 218 may be performed at another part of the process, such as at 224.

At 220 the target cluster 130 generates a private key. For example, the target cluster 130 may use a random number generator to determine the private key.

At 222 the target cluster 130 generates a certificate signing request (CSR) based on the private key. For example, the target cluster 130 may use the private key and the RCAC as inputs to a cryptographic module that generates the CSR.

At 224 the target cluster 130 sends a bootstrap request to the controller device 180. The bootstrap request initiates a mutual authentication process between the target cluster 130 and the controller device 180. The bootstrap request may comprise the cluster identifier, the authentication key, and the CSR. As mentioned above, in another implementation (not depicted), the sending of the registration request at 216 and the validation of the cluster identifier and storage of the authentication key at 218 may be performed at 224. For example, the registration request and storage of the authentication key may be included with the sending of the mTLS bootstrap request.

At 226 the controller device 180 receives and validates the bootstrap request. For example, the validation may include comparing the cluster identifier and the authentication key received in the bootstrap request with the cluster identifier received at 208 and the authentication key received at 218.

At 228, responsive to the CSR in the bootstrap request, the controller device 180 generates a cryptographically signed certificate ("signed certificate") using the RCAC. For example, the cryptographic module of the controller device 180 may process the CSR and generate the signed certificate.

At 230 the controller device 180 sends the signed certificate to the target cluster 130.

At 232 the target cluster 130 establishes a mutually authenticated connection with the controller device 180. The mutually authenticated connection may also encrypt the data in transit. The mutually authenticated connection may be based on the signed certificate. For example, the target cluster 130 may establish a mutual Transport Layer Security (mTLS) connection with the signed certificate comprising an X.509 certificate. Data transmitted via the mTLS connection is encrypted.

In other implementations, other mutually authenticated connection techniques may be used. These may utilize one or more of service account credentials, tokens, and so forth.

At 234 the target cluster 130 establishes remote procedure call (RPC) communication with the controller device 180. For example, an RPC protocol that supports bidirectional communication may be used. In one implementation the RPC communication may comprise a gRPC stream. In other implementations, other RPC protocols may be used. The RPC communication channel, such as a gRPC stream, may be assigned the cluster identifier as an identifying value. For example, a single gRPC stream may be established between the controller device 180 and respective target clusters 130, with each gRPC stream being differentiated by a unique cluster identifier.

At 236, data is transferred between the controller device(s) 180 and the target cluster 130 via the RPC communication. For example, the gRPC stream may be used to send API requests 146 from the controller device 180 to the target cluster 130, send API responses 148 from the target cluster 130 to the controller device 180, and so forth.

At 238, the controller device 180 may store data indicative of an association between the cluster identifier and the gRPC stream. In some implementations, the gRPC stream may be assigned the cluster identifier as an identifying value. This data may then be used by the controller device 180 to determine which gRPC stream to use when sending data to a particular target cluster 130.

Figure 3:
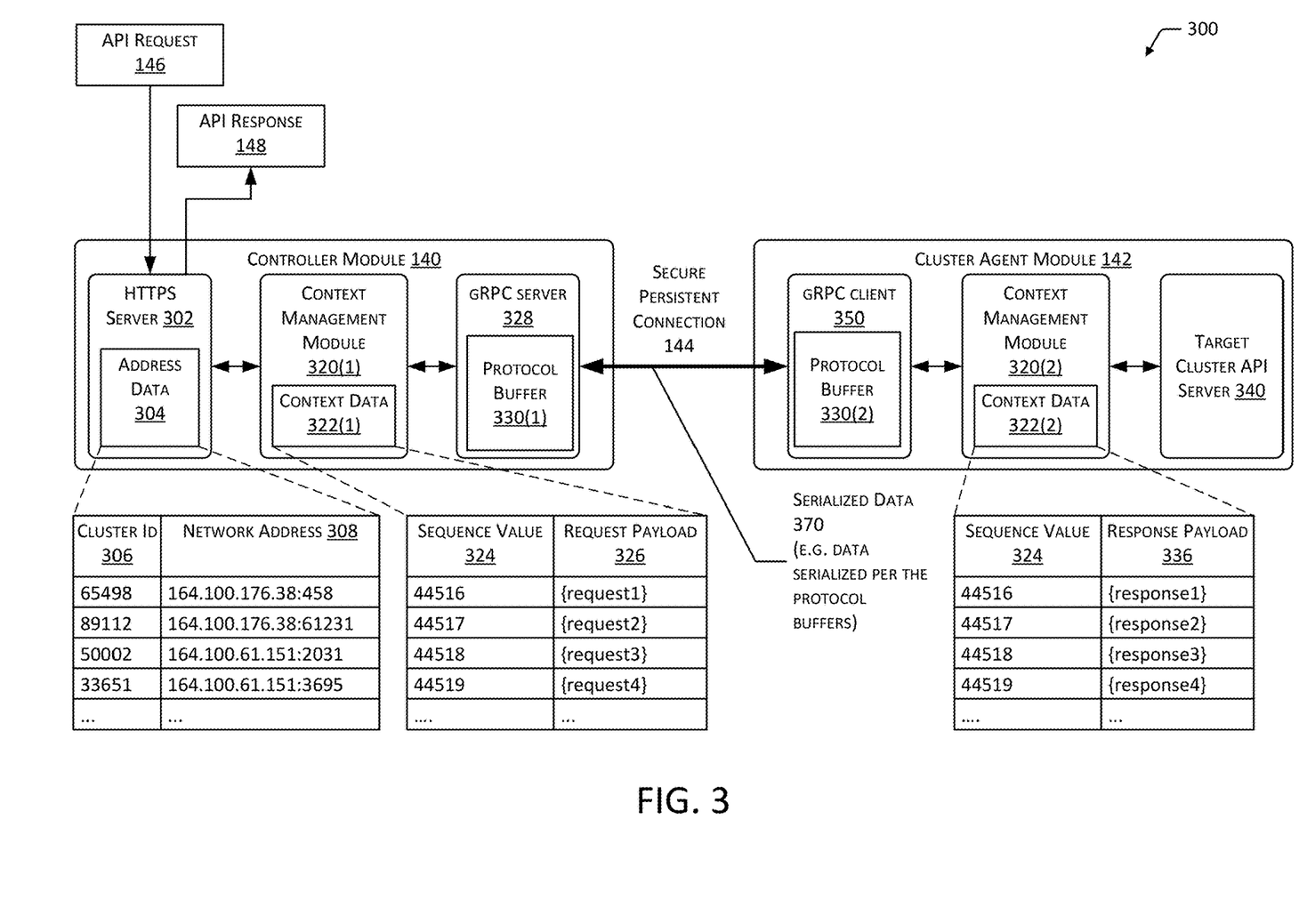
FIG. 3 is a block diagram of a controller module and a cluster agent module used to implement a secure persistent connection, according to one implementation.

FIG. 3 is a block diagram 300 of a controller module 140 and a cluster agent module 142 used to implement an SPC 144, according to one implementation.

The controller module 140 may comprise a Hypertext Transport Protocol Secure (HTTPS) server 302, context management module 320, and an RPC server such as a gRPC server 328.

The HTTPS server 302 responds to requests from other modules to establish HTTPS connections for data transfer. For example, the system 100 may use HTTPS to send API requests 146, receive API responses 148, and so forth. In other implementations, the HTTPS server 302 may utilize other protocols. The API request 146 may comprise information that indicates the cluster identifier associated with a particular target cluster 130. For example, the API request 146 may be addressed to "<cluster-id>/<api-path>" or "<host>/<cluster>/<cluster-id>/<api-path>". The HTTPS server 302 may then direct the API request 146 to the appropriate target cluster 130 as described next.

The HTTPS server 302 may include or access address data 304. The address data 304 may associate cluster identifiers 306 with corresponding network addresses 308. As described above, the cluster identifiers 306 may be determined by the controller module 140. In some implementations, the cluster identifier 306 may comprise a universally unique identifier (UUID). For example, a type 4 UUID may be used. The network address 308 may comprise an internet protocol (IP) address and IP port number. The combination of IP address and IP port number allows the controller module 140 to provide individualized SPCs 144 with a plurality of different target clusters 130 that share a common IP address. This functionality may be of particular use in situations in which a gateway 120 or network address translation (NAT) device is present between the controller device 180 and the target cluster 130.

The HTTPS server 302 is in communication with the context management module 320(1). The context management module 320(1) facilitates multiple concurrent data transfers using the SPC 144. For example, the context management module 320 allows the secure persistent connection 144 to provide for multiplexed communications between the controller module 140 and the cluster agent module 142. In one implementation, the context management module 320 may assign a sequence value 324 to each request payload 326 that is received from the HTTPS server 302. The request payload 326 may comprise, or be based on, at least a portion of the API request 146. The request payload 326 and sequence value 324 may then be sent to the gRPC server 328. In other implementations, values other than a sequence value may be used. For example, a random value may be used.

The gRPC server 328 may use one or more protocol buffers 330(1) to encode serialized data 370 for transmission via the SPC 144 and to decode serialized data 370 received from the RPC communication. The protocol buffer 330 may specify serialization of structured data being transferred. In some implementations, different protocol buffers 330 may be used for different data types. For example, requests may use a first protocol buffer 330 while responses use a second protocol buffer 330. In one implementation, the gRPC server 328 accepts from the context management module 320 the data to be sent to the cluster agent module 142, such as the sequence value 324 and the request payload 326, and encodes it according to the protocol buffer 330(1) to generate serialized data 370 that is then sent to the gRPC client 350.

Similarly, the gRPC server 328 may receive serialized data 370 from a gRPC client 350 and decode using the protocol buffer 330(1) to generate the sequence value 324 and a response payload 336. The gRPC server 328 may implement gRPC and use gRPC protocol buffers. For example, the gRPC protocol buffers may specify name-value pairs for encoding.

The cluster agent module 142 may comprise the gRPC client 350, context management module 320(2), and a target cluster API server 340. The gRPC client 350, or other RPC client, may initiate the RPC communication with the controller module 140 via the mutually authenticated encrypted connection, such as the mTLS connection. For example, the gRPC client 350 may send a request for a gRPC stream to the gRPC server 328.

The gRPC client 350 may use one or more protocol buffers 330(2). In some implementations, the protocol buffers 330(2) may be sent from the controller module 140 to the cluster agent module 142 via the mutually authenticated encrypted connection, included as part of the manifest data, and so forth. In some implementations, the protocol buffers 330 may be encrypted before transmission to target clusters 130. The protocol buffer 330(1) at the gRPC server 328 and the protocol buffer 330(2) at the gRPC client 350 may be identical in some implementations. In other implementations, asymmetrical protocol buffers may be used. For example, a first protocol buffer 330 may specify a first serialization of data from the gRPC server 328 to the gRPC client 350, while a second protocol buffer 330 may specify a second serialization of data from the gRPC client 350 to the gRPC server 328. The gRPC server 328 and the gRPC client 350 may each maintain copies of these two different protocol buffers to permit bidirectional communication.

In some implementations, the protocol buffers 330 may be associated with particular cluster identifiers 306 and may differ from one another. For example, the protocol buffer 330 associated with cluster identifier 306 "65498" may differ from the protocol buffer 330 that is associated with cluster identifier 306 "33651". Variation in the protocol buffers 330 may support particular functionality associated with particular target clusters 130. Variation in the protocol buffers 330 may also improve security by altering the encoding of the serialized data 370 sent between the controller module 140 and different target clusters 130.

In one implementation, the gRPC client 350 accepts the serialized data 370 from the gRPC server 328 and provides the output to the context management module 320(2). The context management module 320(2) may maintain information such as the sequence value 324 and corresponding request payload 326, response payload 336, and so forth. As described above, the context management module 320(2) allows for multiplexed communication via the SPC 144. The request payload 326 may then be sent to the target cluster API server 340. For example, the request payload 326 may comprise the API request 146, that is sent to the target cluster API server 340. Responsive to the API request 146 being sent to the target cluster API server 340, the target cluster API server 340 may return an API response 148 to the context management module 320(2). The context management module 320(2) may then determine response payload 336 and the associated sequence value 324. For example, the response payload 336 may comprise the API response 148 and the sequence value 324 that is associated may be the sequence value 324 corresponding to the API request 146.

In one implementation, the target cluster 130 may include a single target cluster API server 340 as shown. In other implementations, the target cluster 130 may include a plurality of target cluster API servers 340 or other servers. The SPC 144 may be used to provide communication between the controller module 140 and the plurality of servers.

The sequence value 324 and the response payload 336 are provided to the gRPC client 350. The gRPC client 350 may then process the sequence value 324 and the response payload 336 using the protocol buffer 330(2) to determine serialized data 370. The serialized data 370 is sent via the SPC 144 to the gRPC server 328.

The gRPC server 328 receives the serialized data 370 from the gRPC client 350, and, using the protocol buffer 330(1), determines the sequence value 324 and the response payload 336. The API response 148 may be determined based on the sequence value 324 and the response payload 336. The API response 148 is sent to the HTTPS server 302. The HTTPS server 302 then returns the API response 148 to the sender of the API request 146, or other specified destination.

In this illustration the API request 146 is received from outside of the controller module 140. In some implementations the sender of the API request 146 may be part of the controller module 140. For example, the controller module 140 may include a polling module that sends API requests 146 to specified target clusters 130 to request status data.

This illustration depicts the SPC 144 transferring an API request 146 and an API response 148. The system 100 may be used to transfer other data. For example, status data indicative of operation of the target cluster 130 may be sent via the SPC 144 to the controller module 140. In another example, the cluster agent module 142 may send a notification to the controller module 140 indicative of a failure at the target cluster 130.

For clarity of illustration, other modules associated with operation of the system 100 are omitted from FIG. 3. For example, network communication modules, cryptographic modules, mTLS modules, and so forth are not shown.

Figure 4:
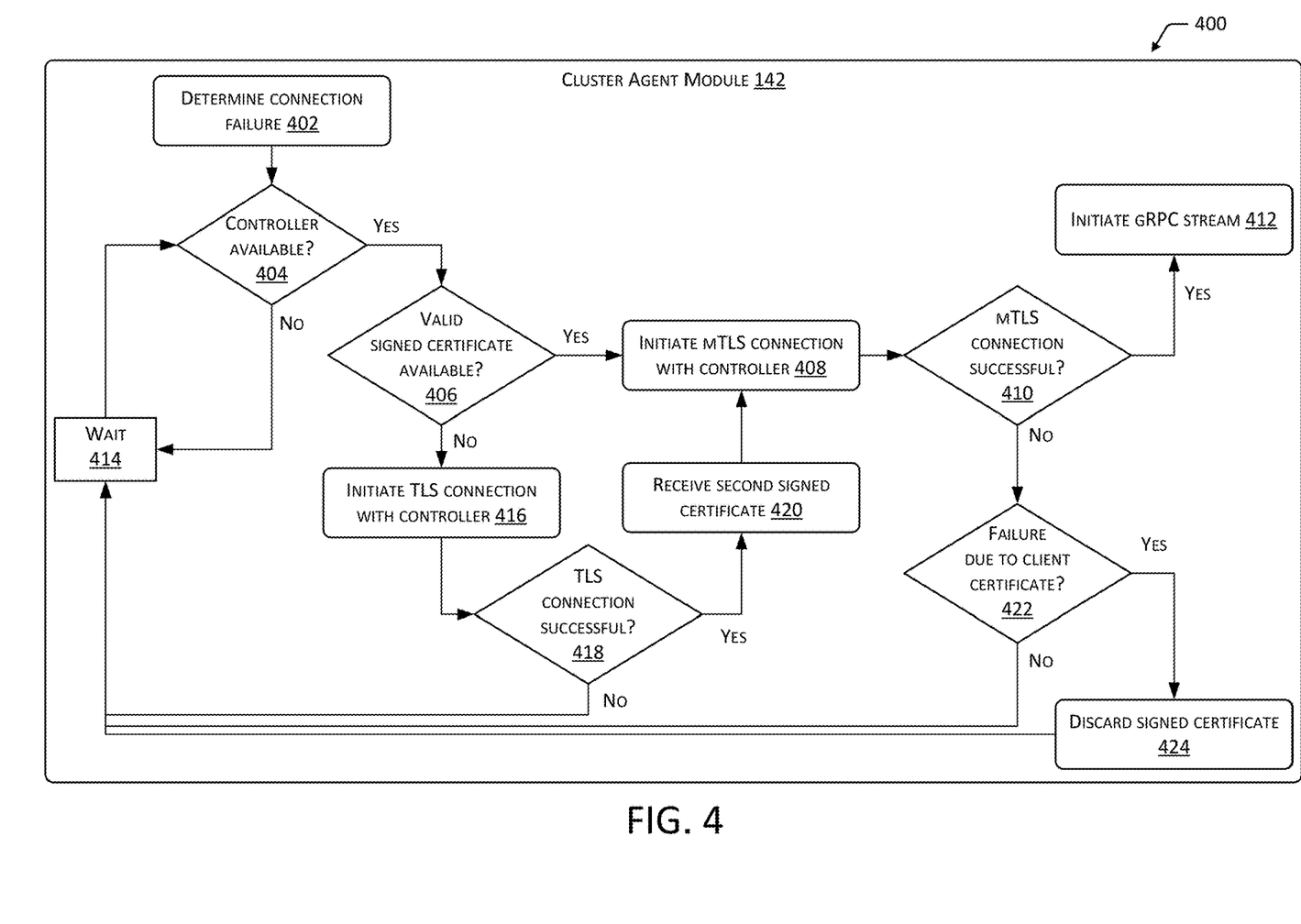
FIG. 4 is a flow diagram of a process used by a cluster agent module to attempt to re-stablish a secure persistent connection, according to one implementation.

FIG. 4 is a flow diagram 400 of a process used by a cluster agent module 142 to attempt to re-establish an SPC 144, according to one implementation. At least a portion of this process may be performed by the cluster agent module 142 or other modules executing on the cluster devices 182 at the target cluster 130.

The SPC 144 may fail in some circumstances. For example, communication between the controller devices 180 and the cluster devices 182 may be lost due to a momentarily failure of a public network 118, transient error, certificate expiration, device restart, and so forth.

At 402 a connection failure is determined. For example, the cluster agent module 142 may determine that no acknowledgement of a test message sent to the controller module 140 was received, that a test message has not been received from the controller module 140 within a threshold period of time, that a cryptographic certificate associated with the mutually authenticated connection has expired, and so forth.

At 404 a determination is made as to whether the controller module 140 is available. For example, an IP ping comprising an Internet Control Message Protocol packet may be sent to the network address of the controller module 140. If at 404 the controller module 140 is determined to be available, the process may proceed to 406. If at 404 the controller module 140 is deemed to be not available, the process may proceed to 414. At 414 a wait for a specified period of time is performed, and the process may then return to 404.

At 406 a determination is made as to whether a valid signed certificate for the mutually authenticated connection is available. For example, an expiration date of the signed certificate sent at 230 may be compared to current real-time. If the expiration date is on or before the current time, the signed certificate may be deemed expired. In another example, a request to the root Certificate Authority may be made to determine if the signed certificate remains valid. If at 406 the signed certificate is deemed to be valid and available, the process may proceed to 408. If not, the process may proceed to 416.

At 408 an attempt to initiate a second mutually authenticated connection with the controller module 140 is performed. For example, the process as described with respect to 222 through 232 may be performed. Continuing the example, an mTLS bootstrap request may be sent to the controller module 140. The process then proceeds to 410.

At 410 a determination is made as to whether the second mutually authenticated connection has been successfully established. For example, if the mTLS bootstrap request results in a second mTLS connection being established, the process is successful. If yes, the process proceeds to 412. If not, the process may proceed to 422.

At 412 a second RPC communication is established using the second mutually authenticated connection. For example, a second gRPC stream may be established via the second mTLS connection.

Returning to 406, if no valid signed certificate is available, at 416 an authenticated connection (not mutual) is established with the controller module 140. For example, a TLS connection may be initiated with the controller module 140.

At 418 a determination is made as to whether the authenticated connection was successful. If not, the process may proceed to 414. If successful, the process may proceed to 420.

At 420 a second signed certificate is received from the controller module 140. The process then proceeds to 408, with the second signed certificate being subsequently used for the remainder of the process.

Returning to 410, if the mutually authenticated connection is not successful, the process may proceed to 422. At 422 a determination is made as to whether the failure is due to the client certificate or another cause. If the failure is due to the client certificate, the process proceeds to 424. At 424 the signed certificate used to try and establish the mutually authenticated connection is discarded. The process then proceeds to 414.

If at 422 the failure is not due to the client certificate, the process proceeds to 414.

By using the process described with respect to FIG. 4, each target cluster 130 and the cluster agent module 142 executing thereon is able to re-establish persistent communication with the controller module 140.

Figure 5:
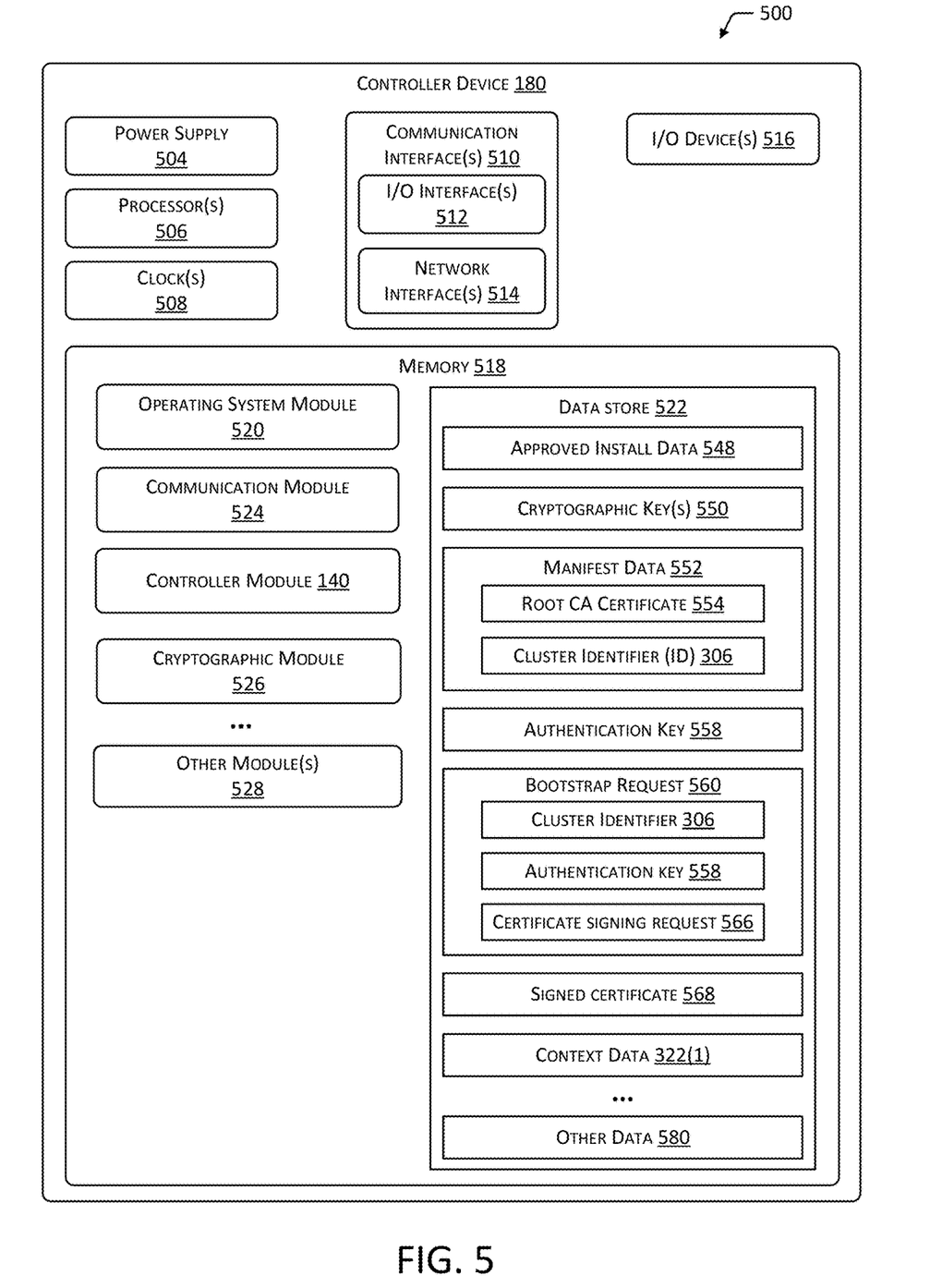
FIG. 5 is a block diagram depicting an implementation of a controller device.

FIG. 5 is a block diagram 500 depicting an implementation of a controller device 180. While FIG. 5 depicts a single block diagram 500 of a single controller device 180, any number and any type of computing devices may be used to perform the functions described herein. These controller devices 180 may be located at one physical location or may be distributed across a plurality of locations. The controller module 140 may comprise instructions that are executed on one or more controller devices 180.

One or more power supplies 504 may be configured to provide electrical power suitable for operating the components of the controller device 180. In some implementations, the power supply 504 may include a rechargeable battery, fuel cell, photovoltaic cell, power conditioning circuitry, and so forth.

The controller device 180 may include one or more hardware processor(s) 506 (processors) configured to execute one or more stored instructions. The processor(s) 506 may include central processor units (CPUs), graphics processor units (GPUs), application specific integrated circuits (ASICs), cryptographic processor, and so forth. The processors may include one or more cores. One or more clock(s) 508 may provide information indicative of date, time, ticks, and so forth. For example, the processor(s) 506 may use data from the clock 508 to generate a timestamp, trigger a preprogrammed action, and so forth.

The controller device 180 may include one or more communication interfaces 510, such as input/output (I/O) interfaces 512, network interfaces 514, and so forth. The communication interfaces 510 may enable the controller device 180, or components of the controller device 180, to communicate with other devices. The I/O interfaces 510 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O devices 516. The I/O devices 516 may include any manner of input devices or output devices associated with the controller device 180. For example, I/O devices 516 may include touch sensors, displays, keyboards, mouse devices, and so forth. In some implementations, the I/O devices 516 may be physically incorporated with the controller device 180. In other implementations, I/O devices 516 may be externally placed.

The network interfaces 514 may be configured to provide communications between the controller device 180 and other devices, such as the I/O devices 516, gateways 120, access points, and so forth. The network interfaces 514 may include devices configured to couple to one or more networks including local area networks (LANs), wireless LANs (WLANs), wide area networks (WANs), wireless WANs, and so forth. For example, the network interfaces 514 may include devices compatible with Ethernet, Wi-Fi, 5G, 6G, LTE, and so forth.

The controller device 180 may include one or more busses or other internal communications hardware or software that allows for the transfer of data between the various modules and components of the controller device 180.

As shown in FIG. 5, the controller device 180 may include one or more memories 518. The memory 518 may include one or more computer-readable storage media (CRSM). The CRSM may be any one or more of an electronic storage medium, a magnetic storage medium, an optical storage medium, a quantum storage medium, a mechanical computer storage medium, and so forth. The memory 518 may provide storage of computer-readable instructions, data structures, program modules, and other data for the operation of the controller device 180. A few example modules are shown stored in the memory 518, although the same functionality may alternatively be implemented in hardware, firmware, or as a system on a chip (SoC).

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processors 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 522 and one or more of the following modules may also be associated with the memory 518. The modules may be executed as foreground applications, background tasks, daemons, and so forth.

The memory 518 may include a communication module 524 configured to establish communications with one or more other modules or devices. Communications may be authenticated, encrypted, and so forth. For example, the communication module 524 may comprise an Internet Protocol stack with mutual Transport Layer Security (mTLS) functionality.

The memory 518 may include the controller module 140 as described herein.

The memory 518 may include a cryptographic module 526. The cryptographic module 526 may provide cryptographic functions such as key generation, certificate signing, certificate validation, cryptographic authentication, and so forth. In some implementations, the cryptographic module 526 may utilized one or more cryptographic processors, random number generation circuitry, and so forth.

Other modules 528 may also be present in the memory 518. For example, other modules 526 may include user interface modules for providing a user interface to the operator device 112. Other modules 528 may also include a permission module to assign, determine, and manage user permissions to access or modify data associated with the controller module 140, target clusters 130, and so forth.

The data store(s) 522 may use a flat file, database, linked list, tree, executable code, script, or other data structure to store information. In some implementations, the data store (s) 522 or a portion of the data store(s) 522 may be distributed across one or more other devices such as network attached storage devices.

The data store 522 may store approved install data 548. The approved install data 548 may comprise one or more cluster identifiers 306 that have been approved for installation and operation with respect to the system 100. For example, responsive to input from the operator device 112, the controller device 180 may generate a cluster identifier 306 and add the cluster identifier 306 to the approved install data 548. The approved install data 548 may then be used, such as at 218, to determine if establishment of an SPC 144 with a particular cluster identifier 306 is permitted.

The data store 522 may store one or more cryptographic keys 550. For example, the cryptographic keys 550 may comprise one or more of a private key, a public key, and so forth.

The data store 522 may store manifest data 552. The manifest data 552 may comprise a root certificate authority certificate (RCAC) 554. The RCAC 552 may be issued by a trusted root certificate authority. In one implementation, the trusted root certificate authority may be part of the controller system 114, in another implementation a third-party may be the trusted root certificate authority.

The manifest data 552 may include the cluster identifier 306 that is associated with a particular target cluster 130.

The data store 522 may store the authentication key 558, such as generated at 214. The authentication key 558 may be associated with the cluster identifier 306 of the target cluster 130 that provided the authentication key 558.

The data store 522 may store the bootstrap request 560 received from the target cluster 130. The bootstrap request 560 may comprise the cluster identifier 306, the authentication key 558, and the certificate signing request (CSR) 566. The CSR 566 may comprise the CSR generated at 222.

The data store 522 may store a signed certificate 568. The signed certificate 568 may be the signed certificate generated at 228.

The data store 522 may store the context data 322(1), as described with regard to FIG. 3.

Other data 580 within the data store(s) 522 may include configurations, settings, preferences, and default values associated with the controller device 180 or other elements of the system. For example, the other data 580 may comprise a Kubernetes etcd file.

In different implementations, different computing devices may have different capabilities or capacities. For example, the controller devices 180 may have greater processing capabilities or data storage capacity than cluster devices 182.

Figure 6:
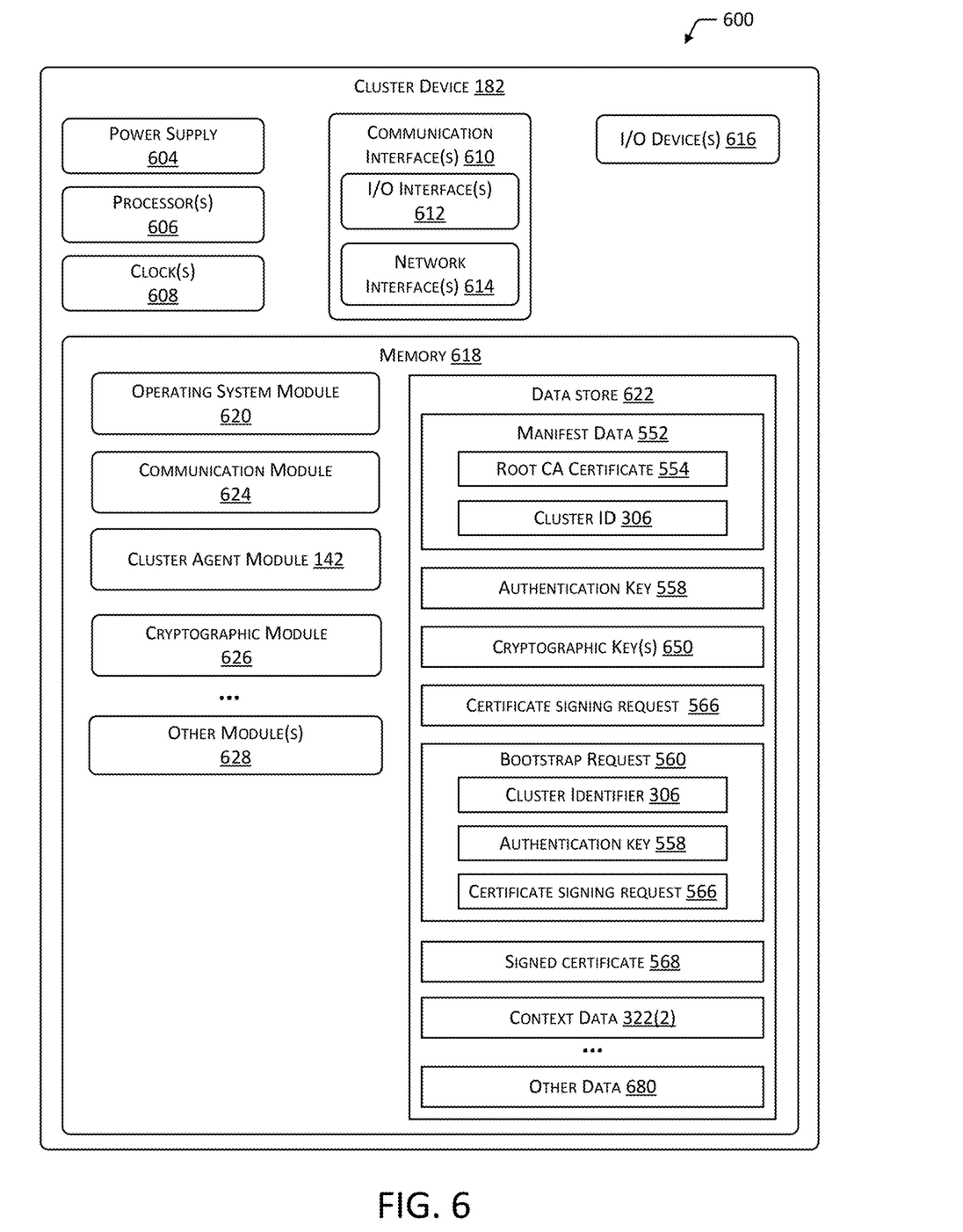
FIG. 6 is a block diagram depicting an implementation of a cluster device.

FIG. 6 is a block diagram 600 depicting an implementation of a cluster device 182. While FIG. 6 depicts a single block diagram 600 of a single cluster device 182, any number and any type of computing devices may be used to perform the functions described herein. These cluster devices 182 may be located at one physical location or may be distributed across a plurality of locations, such as across wireless base stations within a geographic region. The cluster agent module 142 may comprise instructions that are executed on one or more cluster devices 182.

One or more power supplies 604 may be configured to provide electrical power suitable for operating the components of the cluster device 182.

The cluster device 182 may include one or more hardware processor(s) 606 (processors) configured to execute one or more stored instructions. The processor(s) 606 may include CPUs, GPUs, ASICs, cryptographic processors, and so forth.

One or more clock(s) 608 may provide information indicative of date, time, ticks, and so forth. For example, the processor(s) 606 may use data from the clock 608 to generate a timestamp, trigger a preprogrammed action, and so forth.

The cluster device 182 may include one or more communication interfaces 610, such as I/O interfaces 612, network interfaces 614, and so forth. The communication interfaces 610 may enable the cluster device 182, or components of the cluster device 182, to communicate with other devices. The I/O interfaces 610 may include interfaces such as I2C, SPI, USB, RS-232, and so forth.

The I/O interface(s) 612 may couple to one or more I/O devices 616. The I/O devices 616 may include any manner of input devices or output devices associated with the cluster device 182.

The network interfaces 614 may be configured to provide communications between the cluster device 182 and other devices, such as the I/O devices 616, gateways 120, access points, and so forth. The network interfaces 614 may include devices configured to couple to one or more networks including LANs, WLANs, WANs, wireless WANs, and so forth. For example, the network interfaces 614 may include devices compatible with Ethernet, Wi-Fi, 5G, 6G, LTE, and so forth.

The cluster device 182 may include one or more busses or other internal communications hardware or software that allows for the transfer of data between the various modules and components of the cluster device 182.

As shown in FIG. 6, the cluster device 182 may include one or more memories 618. The memory 618 may include one or more CRSM. The memory 618 may provide storage of computer-readable instructions, data structures, program modules, and other data for the operation of the cluster device 182. A few example modules are shown stored in the memory 618, although the same functionality may alternatively be implemented in hardware, firmware, or as a system on a chip (SoC).

The memory 618 may include one or more OS modules 620. The OS module 620 may be configured to manage hardware resource devices such as the I/O interfaces 612, the network interfaces 614, the I/O devices 616, and to provide various services to applications or modules executing on the processors 606.

One or more data stores 622 and one or more of the following modules may also be associated with the memory 618. The modules may be executed as foreground applications, background tasks, daemons, and so forth.

The memory 618 may include a communication module 624 configured to establish communications with one or more other modules or devices. Communications may be authenticated, encrypted, and so forth. For example, the communication module 624 may comprise an Internet Protocol stack with mutual Transport Layer Security (mTLS) functionality.

The memory 618 may include the cluster agent module 142 as described herein.

The memory 618 may include a cryptographic module 626. The cryptographic module 626 may provide cryptographic functions such as key generation, certificate signing, certificate validation, cryptographic authentication, and so forth. In some implementations, the cryptographic module 626 may utilized one or more cryptographic processors, random number generation circuitry, and so forth.

Other modules 628 may also be present in the memory 618.

The data store(s) 622 may use a flat file, database, linked list, tree, executable code, script, or other data structure to store information. In some implementations, the data store(s) 622 or a portion of the data store(s) 622 may be distributed across one or more other devices such as network attached storage devices.

The data store 622 may store the manifest data 552. The manifest data 552 may comprise a RCAC 554. The manifest data 552 may include the cluster identifier 306 that is associated with the target cluster 130 of the cluster devices 182.

The data store 622 may store the authentication key 558, such as generated at 214.

The data store 622 may store one or more cryptographic keys 650. For example, the cryptographic keys 650 may comprise one or more of a private key, a public key, and so forth. Continuing the example, the cryptographic keys 650 may include the private key generated at 220.

The data store 622 may store the bootstrap request 560 generated by the cluster device 182. The bootstrap request 560 may comprise the cluster identifier 306, the authentication key 558, and the CSR 566. The CSR 566 may comprise the CSR generated at 222.

The data store 622 may store the signed certificate 568 received from the controller device 180. The signed certificate 568 may be the signed certificate generated at 228.

The data store 622 may store the context data 322(2), as described with regard to FIG. 3.

Other data 680 within the data store(s) 622 may include configurations, settings, preferences, and default values associated with the cluster device 182 or other elements of the system.

In different implementations, different computing devices may have different capabilities or capacities. For example, the controller devices 180 may have greater processing capabilities or data storage capacity than the operator device 112.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a first set of one or more computing devices comprising:
   one or more first memories storing first computer-executable instructions; and
   one or more first hardware processors to execute the first computer-executable instructions to:
   determine a first cluster identifier associated with a first target cluster, wherein the first target cluster comprises one or more computational services executing on a second set of one or more computing devices at a first location;
determine a first cryptographic certificate that is associated with a certificate authority;
determine manifest data indicative of the first cluster identifier and the first cryptographic certificate;
send the manifest data to the first target cluster;
after the manifest data is sent to the first target cluster, receive from the second set of one or more computing devices, a registration request comprising the first cluster identifier and an authentication key;
validate the first cluster identifier and store the authentication key as associated with the first cluster identifier;
after the first cluster identifier is validated, receive from the second set of one or more computing devices, a first request for mutual authentication comprising a certificate signing request;
after the first request for mutual authentication is received, determine, based on the certificate signing request, a cryptographically signed certificate;
send the cryptographically signed certificate to the second set of one or more computing devices;
establish, using the cryptographically signed certificate, a first connection with the first target cluster, wherein:
the first connection is a mutually authenticated connection with the second set of one or more computing devices and is encrypted, and
the first connection is associated with a first internet protocol (IP) address and a first IP port of the second set of one or more computing devices;
establish remote procedure call (RPC) communication with the second set of one or more computing devices via the first connection, wherein the RPC communication implements gRPC; and
establish a second connection with a second target cluster, wherein:
the second target cluster is associated with a second cluster identifier, and
the second connection is associated with the first IP address and a second IP port.

2. The system of claim 1, the one or more first hardware processors to further execute the first computer-executable instructions to:
receive an application programming interface (API) request that is associated with the first cluster identifier;
send, using the RPC communication, the API request to the second set of one or more computing devices;
receive, using the RPC communication, an API response from the second set of one or more computing devices; and
send the API response.

3. The system of claim 1, wherein the first connection implements mutual Transport Layer Security (mTLS).

4. The system of claim 1, wherein data transferred via the RPC communication is formatted based on a gRPC protocol buffer.

5. The system of claim 1, the one or more first hardware processors to further execute the first computer-executable instructions to:
receive a first message from a first sender that is addressed to the first cluster identifier;
receive a second message from a second sender that is addressed to the first cluster identifier;
associate a first sequence value with the first message;
send, using the RPC communication, the first sequence value and the first message;
associate a second sequence value with the second message;
send, using the RPC communication, the second sequence value and the second message;
receive, using the RPC communication, the first sequence value and a first response;
send, based on the first sequence value, the first response to the first sender;
receive, using the RPC communication, the second sequence value and a second response; and
send, based on the second sequence value, the second response to the second sender.

6. The system of claim 1, further comprising:
the second set of one or more computing devices comprising:
one or more second memories storing second computer-executable instructions; and
one or more second hardware processors to execute the second computer-executable instructions to:
receive the manifest data;
install one or more computer-executable modules specified by the manifest data;
determine the authentication key;
generate a private key;
determine the certificate signing request using the private key; and
send the first request for mutual authentication to the first set of one or more computing devices.

7. The system of claim 1, further comprising:
the second set of one or more computing devices comprising:
one or more second memories storing second computer-executable instructions; and
one or more second hardware processors to execute the second computer-executable instructions to:
determine a failure of one or more of the first connection or the RPC communication;
determine the first set of one or more computing devices is available;
determine the cryptographically signed certificate is one or more of unavailable, expired, or invalid;
send a second request for mutual authentication comprising a second certificate signing request;
receive a second cryptographically signed certificate from the first set of one or more computing devices;
establish a third connection with the first set of one or more computing devices, wherein the third connection is a mutually authenticated connection with the first set of one or more computing devices and is encrypted; and
establish the RPC communication with the first set of one or more computing devices via the third connection.

8. The system of claim 1, the one or more first hardware processors to further execute the first computer-executable instructions to:
transfer data to the first target cluster via a first gRPC stream; and
transfer data to the second target cluster via a second gRPC stream.

9. A computer-implemented method comprising:
    determining a first identifier associated with a first cluster, wherein the first cluster comprises one or more computational services executing on a first set of devices at a first location;
    determining a first cryptographic certificate that is associated with a certificate authority;
    determining manifest data indicative of the first identifier and the first cryptographic certificate;
    sending the manifest data to the first set of devices;
    after the sending the manifest data, receiving from the first set of devices, the first identifier and an authentication key;
    after the receiving the first identifier and the authentication key, validating the first identifier and storing the authentication key as associated with the first identifier;
    after the validating the first identifier, receiving from the first set of devices, a first request for mutual authentication comprising a certificate signing request;
    after the receiving the first request, determining, based on the first cryptographic certificate and the certificate signing request, a cryptographically signed certificate;
    sending the cryptographically signed certificate to the first set of devices;
    establishing, using the cryptographically signed certificate, a first connection with the first set of devices, wherein the first connection is a mutually authenticated connection with the first set of devices and is encrypted;
    establishing remote procedure call (RPC) communication with the first set of devices via the first connection, wherein:
        the RPC communication implements gRPC, and
        at least a portion of data transferred via the RPC communication is formatted based on a gRPC protocol buffer;
    receiving a first message from a first sender that is addressed to the first identifier;
    determining a first sequence value that is associated with the first message;
    sending, using the RPC communication, the first sequence value and the first message; and
    receiving, using the RPC communication, the first sequence value and a first response.

10. The computer-implemented method of claim 9, further comprising:
    receiving an application programming interface (API) request that is associated with the first identifier;
    sending the API request to the first set of devices via the RPC communication; and
    receiving an API response from the first set of devices via the RPC communication.

11. The computer-implemented method of claim 9, wherein the first connection implements mutual Transport Layer Security (mTLS).

12. The computer-implemented method of claim 9, further comprising:
    sending the first response to the first sender.

13. The computer-implemented method of claim 9, wherein the first connection is associated with a first internet protocol (IP) address and a first IP port number of the first set of devices; and further comprising:
    establishing a second connection with a second identifier that is associated with a second cluster, wherein the second connection uses the first IP address and a second IP port number.

14. The computer-implemented method of claim 9, further comprising:
    receiving, at the first set of devices, the manifest data;
    installing, at the first set of devices, software specified by the manifest data;
    determining, at the first set of devices, the authentication key;
    generating, at the first set of devices, a private key;
    determining, at the first set of devices, the certificate signing request using the private key; and
    sending, from the first set of devices, the first request for mutual authentication.

15. The computer-implemented method of claim 9, further comprising:
    determining, at the first set of devices, a failure of one or more of the first connection or the RPC communication;
    determining, at the first set of devices, the cryptographically signed certificate is one or more of unavailable, expired, or invalid;
    sending, from the first set of devices, a second request for mutual authentication comprising a second certificate signing request;
    receiving, from the first set of devices, a second cryptographically signed certificate;
    establishing, from the first set of devices, a second connection wherein the second connection is a mutually authenticated connection and is encrypted; and
    establishing the RPC communication via the second connection.

16. The computer-implemented method of claim 9, further comprising:
    transferring data to the first cluster via a gRPC stream.

17. A computer-implemented method comprising:
    receiving manifest data comprising a first identifier and a first cryptographic certificate;
    after the receiving the manifest data, installing software specified by the manifest data;
    after the installing the software, determining an authentication key;
    after the determining the authentication key, validating a first set of devices and sending, to the first set of devices, a first request comprising the first identifier and the authentication key;
    generating a private key;
    generating a certificate signing request using the private key;
    generating a bootstrap request that comprises the certificate signing request;
    sending the bootstrap request that comprises the certificate signing request to the first set of devices;
    after the sending the bootstrap request that comprises the certificate signing request to the first set of devices, receiving, from the first set of devices, a cryptographically signed certificate;
    establishing, using the cryptographically signed certificate, a first connection with the first set of devices, wherein:
        the first connection is a mutually authenticated connection with the first set of devices and is encrypted; and
    establishing remote procedure call (RPC) communication with the first set of devices via the first connection, wherein:
        the RPC communication implements gRPC, and
        data transferred via the RPC communication is formatted based on a gRPC protocol buffer.

18. The computer-implemented method of claim 17, further comprising:
- determining a failure of one or more of the first connection or the RPC communication;
- determining the cryptographically signed certificate is one or more of unavailable, expired, or invalid;
- generating a second certificate signing request using the private key;
- sending a second request for mutual authentication comprising the second certificate signing request;
- receiving, from the first set of devices, a second cryptographically signed certificate;
- establishing a second connection with the first set of devices, wherein the second connection is a mutually authenticated connection and is encrypted; and
- establishing the RPC communication via the second connection.

19. The computer-implemented method of claim 17, further comprising:
- receiving, via the RPC communication, an application programming interface (API) request that is associated with the first identifier;
- sending the API request;
- receiving an API response; and
- sending the API response to the first set of devices via the RPC communication.

20. The computer-implemented method of claim 17, wherein the first connection implements mutual Transport Layer Security (mTLS).

* * * * *

UNITED STATES PATENT AND TRADEMARK OFFICE
CERTIFICATE OF CORRECTION

| | | |
|---|---|---|
| PATENT NO. | : 12,323,537 B1 | Page 1 of 1 |
| APPLICATION NO. | : 17/662784 | |
| DATED | : June 3, 2025 | |
| INVENTOR(S) | : Prabhjot Singh Sethi | |

It is certified that error appears in the above-identified patent and that said Letters Patent is hereby corrected as shown below:

On the Title Page

Missing References under "(56) References Cited":
--US 11,748,178 Bachmutsky et al
US 6,671,273 Beck et al--

Signed and Sealed this
Fifteenth Day of July, 2025

Coke Morgan Stewart
*Acting Director of the United States Patent and Trademark Office*